US008294387B2

(12) United States Patent
Hamada

(10) Patent No.: US 8,294,387 B2
(45) Date of Patent: Oct. 23, 2012

(54) BACKLIGHT DEVICE AND DISPLAY DEVICE USING THE SAME FOR ADJUSTING COLOR TONE OF ILLUMINATION LIGHT

(75) Inventor: Tetsuya Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 410 days.

(21) Appl. No.: 12/676,934

(22) PCT Filed: Apr. 14, 2008

(86) PCT No.: PCT/JP2008/057261
§ 371 (c)(1), (2), (4) Date: Mar. 8, 2010

(87) PCT Pub. No.: WO2009/041100
PCT Pub. Date: Apr. 2, 2009

(65) Prior Publication Data

US 2010/0194292 A1 Aug. 5, 2010

(30) Foreign Application Priority Data

Sep. 26, 2007 (JP) ................................. 2007-249724

(51) Int. Cl.

| | |
|---|---|
| ***H05B 37/02*** | (2006.01) |
| ***H05B 39/04*** | (2006.01) |
| ***H05B 41/36*** | (2006.01) |
| ***G06F 1/00*** | (2006.01) |
| *H05B 39/02* | (2006.01) |
| *G09G 5/10* | (2006.01) |

(52) U.S. Cl. ..................... 315/297; 315/209 R; 345/690

(58) Field of Classification Search ........................ None
See application file for complete search history.

(56) References Cited

U.S. PATENT DOCUMENTS

| | | | | |
|---|---|---|---|---|
| 7,295,180 | B2 * | 11/2007 | Ichikawa et al. | 345/102 |
| 2002/0003544 | A1 * | 1/2002 | Ohtsuka et al. | 345/589 |
| 2007/0120496 | A1 | 5/2007 | Shimizu et al. | |
| 2010/0134020 | A1 * | 6/2010 | Peng et al. | 315/133 |

FOREIGN PATENT DOCUMENTS

| | | | |
|---|---|---|---|
| JP | 2002-134284 | A | 5/2002 |
| JP | 2002-324685 | A | 11/2002 |
| JP | 2002324685 | A * | 11/2002 |
| JP | 2003-163090 | A | 6/2003 |
| JP | 2007-42758 | A | 2/2007 |
| WO | WO-2005/011006 | A1 | 2/2005 |

* cited by examiner

*Primary Examiner* — Douglas W Owens
*Assistant Examiner* — Dedei K Hammond
(74) *Attorney, Agent, or Firm* — Birch, Stewart, Kolasch & Birch, LLP

(57) ABSTRACT

A backlight device (2) that emits illumination light toward the exterior includes a white light-emitting diode (4) that emits white light, and a LED lighting circuit (lighting control section) (12) configured to be capable of controlling a lighting drive of the light-emitting diode (4) by using PWM dimming. The LED lighting circuit (12) adjusts a color tone of the illumination light by modifying ON time of a duty ratio by PWM dimming and a value of supply current to be supplied to the light-emitting diode (4).

8 Claims, 6 Drawing Sheets

BACKLIGHT DEVICE AND DISPLAY DEVICE USING THE SAME FOR ADJUSTING COLOR TONE OF ILLUMINATION LIGHT

TECHNICAL FIELD

The present invention relates to a backlight device, particularly a backlight device including a light emitting diode, and also a display device using the backlight device.

BACKGROUND ART

In recent years, e.g., a liquid crystal display device has been widely used for a liquid crystal television, a monitor, a portable telephone, etc. as a flat panel display having features such as a smaller thickness and a lighter weight compared to a conventional cathode ray tube. Such a liquid crystal display device includes an illumination device (backlight device) and a liquid crystal panel. The backlight device emits light and the liquid crystal panel displays a desired image by serving as a shutter with respect to light from a light source provided in the backlight device.

Furthermore, as the aforementioned backlight device, an edge light type or a direct type backlight device is provided in which a linear light source constituted of a cold-cathode tube or a hot-cathode tube is disposed on a side of or below the liquid crystal panel. However, the cold-cathode tube such as described above and the like contains mercury, resulting in difficulty in, for example, recycling the cold-cathode tube to be disposed of. In view of this, a backlight device whose light source is light emitting diodes (LEDs) in which mercury is not used has been developed. In a backlight device using such a LED, a light-emitting diode that emits white light is used, or a three kinds of light-emitting diodes emitting lights of respective colors of red (R), green (G) and blue (B), and the lights from the three kinds of light-emitting diodes are mixed in the white light so as to obtain illumination light to be radiated onto the liquid crystal panel.

Further, in the conventional backlight device, as described in JP 2007-42758 A for example, it is suggested to provide in series a plurality of light-emitting diodes emitting white light, and to drive these light-emitting diodes at a constant current. In the conventional backlight device, a supply voltage to be supplied to the light-emitting diodes is optimized to reduce the heat release of a circuit element group including the light-emitting diodes, thereby enabling stable lighting of the backlight device even at a time of dimming.

DISCLOSURE OF INVENTION

Problem to be Solved by the Invention

In the meantime, in the conventional backlight device as described above, it is possible to adjust the luminosity of the illumination light toward the liquid crystal panel (exterior) by modifying the supply voltage to be supplied to the white light-emitting diodes.

However, in this conventional backlight device, unlike a backlight device using RGB tricolor light-emitting diodes, it is impossible to modify the color tone of the illumination light. Therefore, when the light-emitting diodes deteriorate due to aging for example, the light emission performance may be degraded.

Specifically, in the conventional backlight device as described above, so-called pseudo-white light-emitting diodes including a light-emitting component (chip) that emit blue light for example and a sealing resin that is provided to cover this light-emitting component and that contains either a yellow fluorescent material or fluorescent materials of green and red have been used. In the conventional backlight device that uses the pseudo-white light-emitting diodes, when the fluorescent material, the sealing resin and the like deteriorate due to aging and thus the color tone of light from the light-emitting diode changes, the color tone of the illumination light changes similarly and it cannot be corrected. That is, in the backlight device that uses the tricolor light-emitting diodes, it is possible to modify the color tone of illumination light by adjusting the ratios of respective light colors of RGB, but, in the conventional backlight device as described above, it is impossible to adjust the ratio of light from the light-emitting diodes. As a result, in the conventional backlight device as described above, the color tone of the illumination light cannot be modified, resulting in degradation in the light emission performance.

Therefore, with the foregoing in mind, it is an object of the present invention to provide a backlight device that has excellent light emission performance and that can adjust the color tone of illumination light toward the exterior even when a white light-emitting diode deteriorates due to aging, and a display device using the backlight device.

Means for Solving Problem

For achieving the above-mentioned object, a backlight device according to the present invention is a backlight device that emits illumination light toward the exterior. The backlight device includes a white light-emitting diode that emits white light, and a lighting control section that is capable of controlling lighting drive of the light-emitting diode by using PWM dimming. The lighting control section modifies ON time of a duty ratio by the PWM dimming and a value of supply current to be supplied to the light-emitting diode, and thereby to adjust a color tone of the illumination light.

The thus configured backlight device includes a lighting control section that adjusts the color tone of the illumination light by modifying the ON time of the duty ratio by PWM dimming and the value of supply current to be supplied to the white light-emitting diode. Thereby, unlike a conventional backlight device, it is possible to configure a backlight device having excellent light emission performance that can adjust the color tone of illumination light to the exterior even when the white light-emitting diode deteriorates due to aging.

In the backlight device, it is preferable that the lighting control section includes a drive instructing section that modifies the ON time of the duty ratio and the value of supply current in a state where a value of effective current to be supplied to the light-emitting diode is kept constant, at the time of adjusting the color tone of the illumination light to a predetermined color tone.

In this case, since the drive instructing section adjusts the color tone of the illumination light to a predetermined color tone in a state where the value of effective current to be supplied to the light-emitting diode is kept constant, fluctuation in the luminescence of the illumination light can be prevented, and thus a backlight device with higher performance can be provided.

In the backlight device, the drive instructing section may have a timer section that modifies the ON time of the duty ratio and the value of supply current in accordance with the lighting time of the light-emitting diode.

In this case, the ON time and the value of supply current may be modified suitably in accordance with the aged deterioration of the light-emitting diode, and the color tone of the illumination light can be adjusted suitably, and thus excellent light emission performance can be maintained easily.

It is preferable that the backlight device includes a color sensor section that detects chromaticity of the illumination light, and that the drive instructing section includes a deciding section that decides variation of the color tone of the illumination light by using a detection result from the color sensor section and a modification instructing section that modifies the ON time of the duty ratio and the value of supply current by using the decision result from the deciding section.

In this case, the color tone of the illumination light can be adjusted with preciseness, and thus a backlight device having excellent light emission performance can be configured easily.

In the backlight device, the predetermined color tone may be an initial value of a color tone of light emitted by the light-emitting diode.

In this case, variation in the color tone caused by aged deterioration of the light-emitting diode can be suppressed surely.

It is preferable in the backlight device that the light-emitting diode in use is classified into any of at least two chromaticity ranks based on a result of a preliminary measurement of chromaticity.

In this case, a backlight device that has excellent light emission performance and that enables adjustment of the color tone of the illumination light easily can be provided.

A display device of the present invention is characterized in that it uses any of the above-described backlight devices.

The thus configured display device includes a backlight device with excellent light emission performance that can adjust the color tone of illumination light toward the exterior even when a white light-emitting diode deteriorates due to aging. Therefore, a low-cost and high-performance display device having excellent display quality can be configured easily.

Effects of the Invention

According to the present invention, it is possible to provide a backlight device, with excellent light emission performance that can adjust a color tone of illumination light toward the exterior even when a white light-emitting diode deteriorates due to aging, and a display device using the backlight device.

BRIEF DESCRIPTION OF DRAWINGS

FIG. 5 includes diagrams for illustrating operation examples of the backlight device.

DESCRIPTION OF THE INVENTION

Hereinafter, embodiments of a backlight device of the present invention, and also embodiments of a display device using the same will be specified with reference to the attached drawings. The description below refers to cases where the present invention is applied to a transmission type liquid crystal display device. It should be noted that the dimensions of the components in each of the drawings do not necessarily indicate the actual dimensions of the components and dimensional ratios among the respective components and the like.

Embodiment 1

Figure 1:
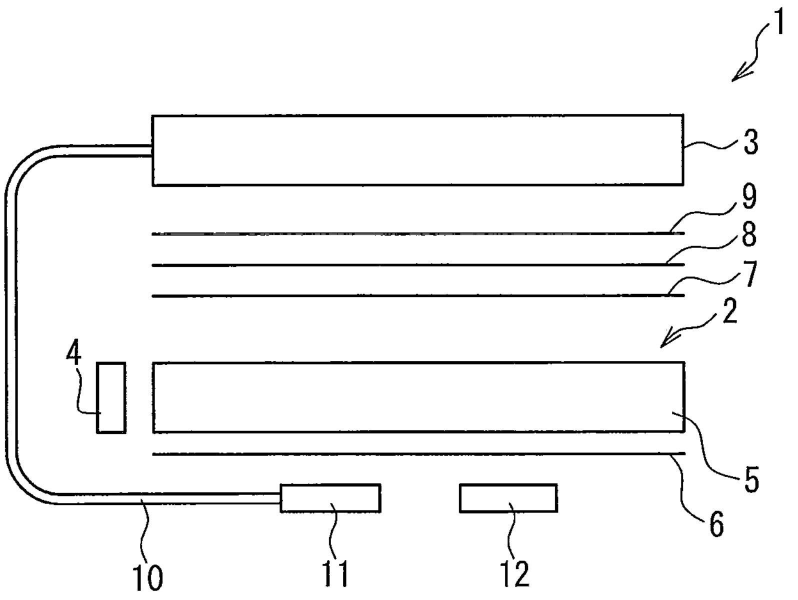
FIG. 1 is a diagram for illustrating a backlight device and a liquid crystal display device according to Embodiment 1 of the present invention.
Figure 2:
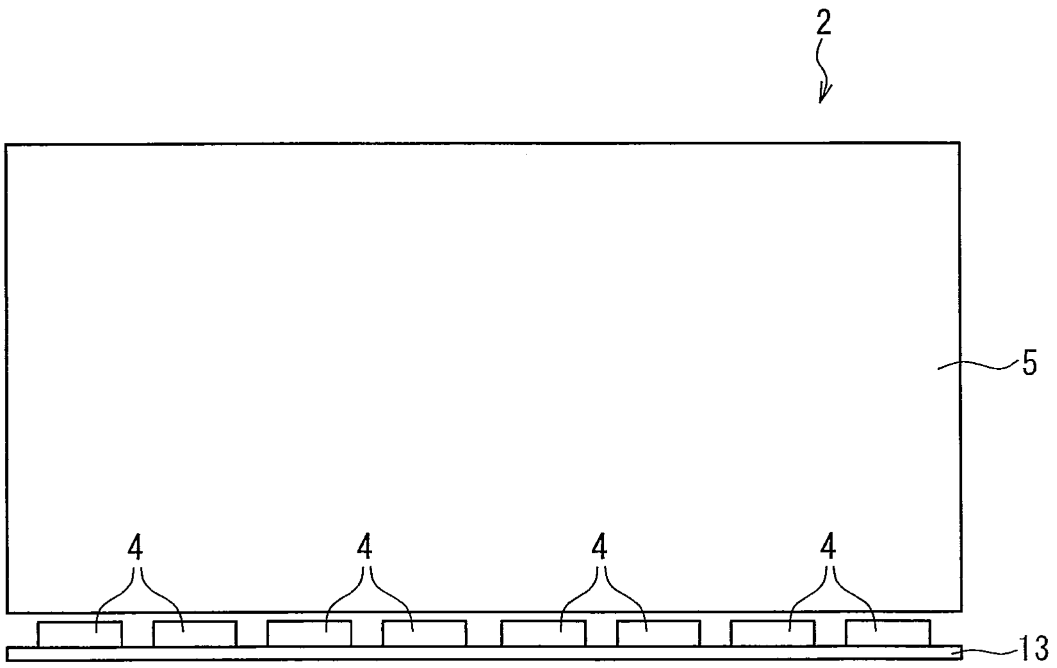
FIG. 2 is a diagram for illustrating configurations of main components of the backlight device.

FIG. 1 is a diagram illustrating a backlight device and a liquid crystal display device according to Embodiment 1 of the present invention. FIG. 2 is a diagram for illustrating configurations of main components of the backlight device. In FIGS. 1 and 2, a liquid crystal display device 1 of the present embodiment includes a backlight device 2 and a liquid crystal panel 3 irradiated with light from the backlight device 2 and serving as a displaying section to display information. The backlight device 2 and the liquid crystal panel 3 are integrated with each other to form a transmission type liquid crystal display device 1.

The backlight device 2 includes a plurality of light-emitting diodes 4 as light sources, a light guide plate 5 to which light from each of the plural light-emitting diodes 4 is introduced, and a reflection sheet 6 provided on the side of the light guide plate 5 not facing the liquid crystal panel 3, thereby planar illumination light is irradiated from the light guide plate 5 toward the liquid crystal panel 3. As shown in FIG. 2, in the backlight device 2, eight light-emitting diodes 4 mounted linearly on a LED mount board 13 are used.

For each of the light-emitting diodes 4, for example, a so-called pseudo-white light-emitting diode that emits white light is used. The light-emitting diode is made of a light-emitting component (chip) that emits blue light for example, and a sealing resin that is provided to cover the light-emitting component and contains a yellow fluorescent material or green and red fluorescent materials. The number of the light-emitting diodes 4 to be provided, the type, the size and the like are selected in accordance with the size of the liquid crystal panel 3, and the display performance such as luminance and display quality required for the liquid crystal panel 3. Specifically, for each of the light-emitting diodes 4, either a power LED that consumes power of about 1 W or a chip LED that consumes power of about 70 mW is to be used suitably.

In the backlight device 2 of the present embodiment, the chromaticity of each light-emitting diode 4 is measured previously, and the light-emitting diodes 4 in use are classified into at least two chromaticity ranks on the basis of the measurement result. Further, eight light-emitting diodes 4 in use are of the same chromaticity rank.

In the liquid crystal display device 1, for example a polarizing sheet 7, prism (focusing) sheet 8, and a diffusing sheet 9 are provided between the liquid crystal panel 3 and the light guide plate 5. These optical sheets serve to raise suitably the luminance of the illumination light from the backlight device 2 for example, and thereby improving the display performance of the liquid crystal panel 3.

In the liquid crystal display device 1, a signal line (source line) and a control line (gate line) both of which are included in the liquid crystal panel 3 and not shown in the drawing are connected to a drive control circuit 11 via an FPC (Flexible Printed Circuit) 10. In the liquid crystal display device 1, the drive control circuit 11 is to carry out a drive control per pixel with respect to the signal line and the control line. And as illustrated in FIG. 1, in the vicinity of the drive control circuit 11, a LED lighting circuit 12 as a lighting control section for lighting-drive of the light-emitting diodes 4 is provided. This LED lighting circuit 12 is configured to be capable of controlling the drive for lighting the light-emitting diodes 4 by using PWM dimming, for example. Further, as described in detail below, the LED lighting circuit 12 is configured to be capable of adjusting the color tone of the illumination light even when the light-emitting diodes 4 deteriorate due to aging.

For the light guide plate 5, for example, a synthetic resin such as transparent acrylic resin is used. As shown in FIG. 1, the light guide plate 5 has a rectangular cross section, and the left-side surface of the light guide plate 5 in FIG. 1 functions as an incident surface. Namely, light from each of the eight light-emitting diodes 4 aligned on the LED mount board 13 is introduced into the light guide plate 5 through the incident surface. The light from the light-emitting diodes 4, which is introduced through the incident surface into the interior of the light guide plate 5, is guided toward the right-side surface and at the same time, emitted suitably as illumination light due to the reflection sheet 6 toward the liquid crystal panel 3 from the light emission surface disposed opposite to the diffusing sheet 9.

Specifically, the light-emitting diodes 4, the LED mount board 13, the light guide plate 5, and the reflection sheet 6 are housed in a case (not shown), and light from each of the light-emitting diodes 4 is efficiently introduced into the interior of the light guide plate 5 directly or indirectly via a reflector, while a leakage of light to the exterior is minimized. Thus, in the backlight device 2, the light utilization efficiency of each of the light-emitting diodes 4 can be easily improved, so that high luminance of the illumination light can be readily achieved.

Figure 3:
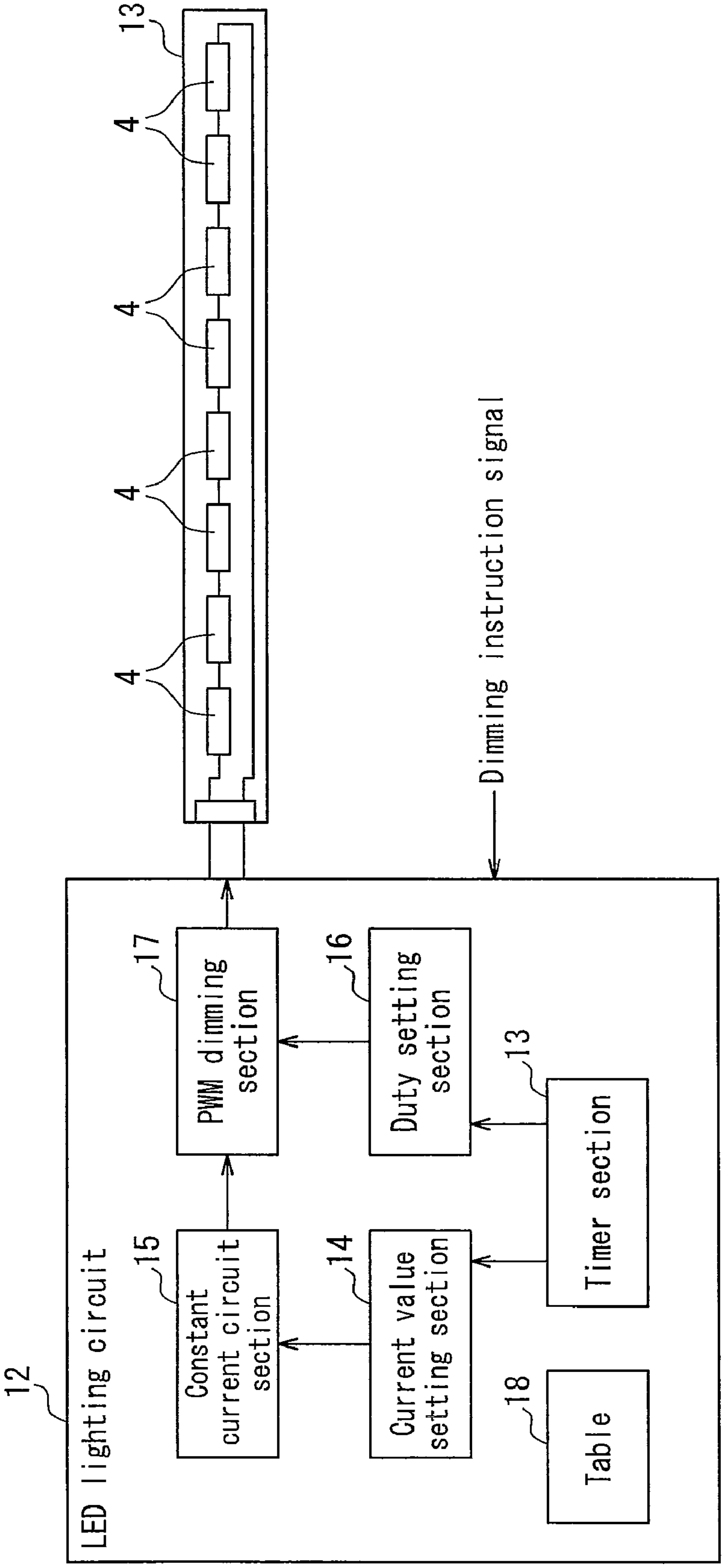
FIG. 3 is a diagram for illustrating an example of configuration of the LED lighting circuit as shown in FIG. 1.
Figure 4:
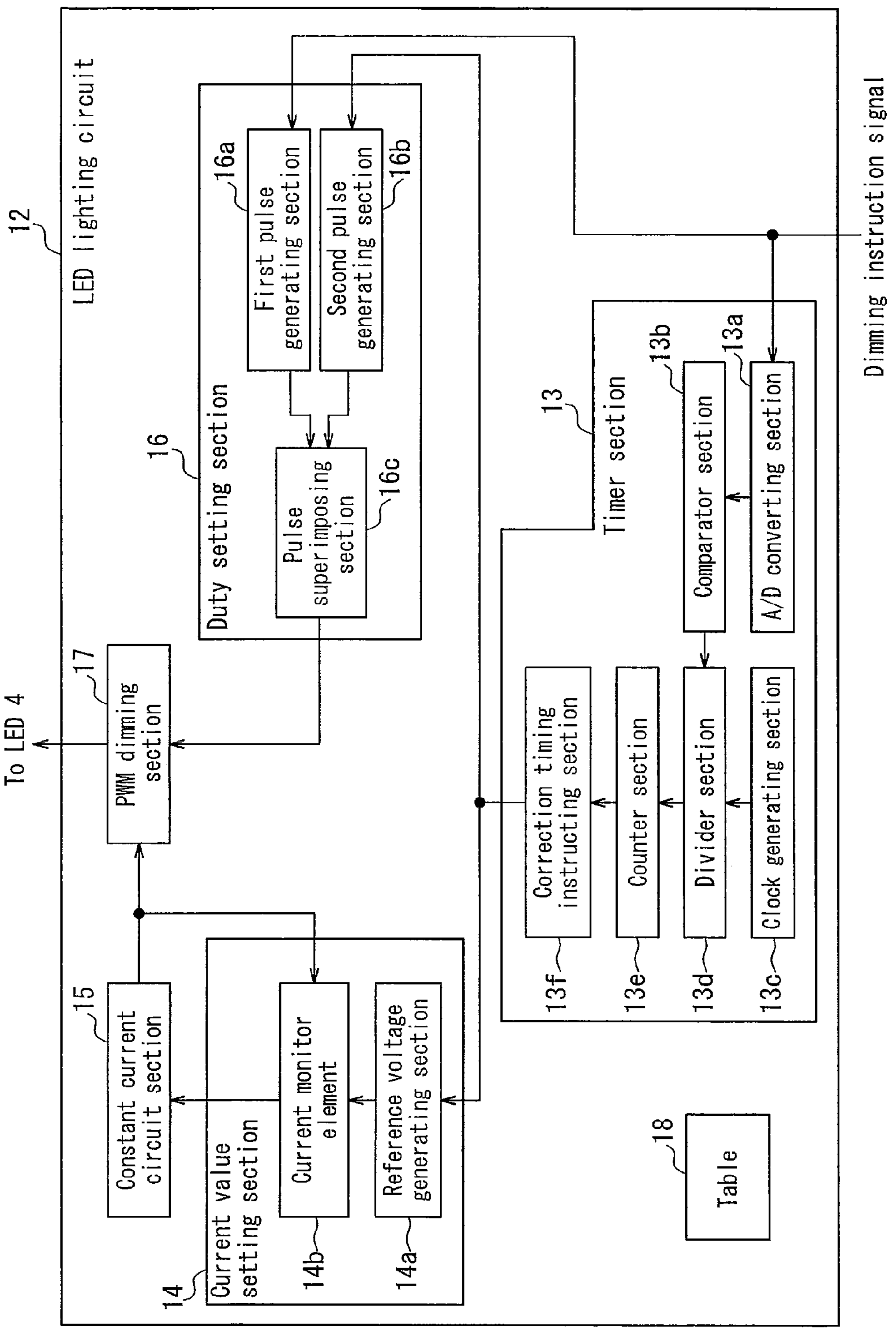
FIG. 4 is a block diagram for showing a specific configuration of the LED lighting circuit as shown in FIG. 3.

Here, the LED lighting circuit 12 will be specified with reference to FIGS. 3 and 4.

FIG. 3 is a diagram for illustrating an example of configuration of the LED lighting circuit as shown in FIG. 1. FIG. 4 is a block diagram showing a specific configuration of the LED lighting circuit as shown in FIG. 3.

As shown in FIG. 3, the LED lighting circuit 12 includes for example a timer section 13 composed or CPU, MPU or the like, a current value setting section 14, a constant current circuit section 15, a duty setting section 16, and a PWM dimming section 17. The LED lighting circuit 12 includes further a table 18 that uses a non-volatile memory such as EEPROM and that in advance stores data indicating a relationship between the lighting time of the light-emitting diodes 4 and the change in color tone of the illumination light and also predetermined data used at every portion of the LED lighting circuit 12. Namely, data showing the relationship between the lighting time of the light-emitting diodes 4 and the change in color tone of the illumination light or the like are attained in advance through experiments, simulations or the like and then stored on the table 18.

Further the LED lighting circuit 12 is configured so that a dimming instruction signal will be inputted from an operation inputting device (not shown) such as a remote controller provided to the liquid crystal display device 1, and individual instruction values of chromaticity, luminance and the like desired by the user will be notified with the dimming instruction signal. And in accordance to the thus inputted dimming instruction signal, the LED lighting circuit 12 supplies power to the eight light-emitting diodes 4 connected in series.

The LED lighting circuit 12 modifies not only the ON/OFF duty ratio by PWM dimming ((pulse width of) ON time) but the value of supply current to be supplied to the light-emitting diodes 4, and thus the LED lighting circuit 12 is capable of adjusting automatically the color tone of the illumination light to a predetermined color tone, or adjusting to a color tone desired by the user. The LED lighting circuit 12 modifies the ON time of the duty ratio and the value of supply current in a state where the value of effective current to be supplied to the light-emitting diode 4 is kept constant, at a time of adjusting the color tone of the illumination light to a predetermined color tone. For the predetermined color tone, for example, the initial value of color tone of light emitted by the light-emitting diodes 4 is used.

Specifically, the LED lighting circuit 12 includes the timer section 13 that modifies the ON time of the duty ratio and the value of supply current in accordance with the lighting time of the light-emitting diodes 4. The LED lighting circuit 12 includes further the duty setting section 16 that sets the duty ratio by using a dimming instruction signal from the exterior and the instruction signal from the timer section 13, and also the current value setting section 14 that sets a value of supply current by using the instruction signal from the timer section 13. Further, the LED lighting circuit 12 includes the constant current circuit section 15 and the PWM dimming section 17. The constant current circuit section 15 is connected to a power source circuit not shown and generates and outputs a constant current to the PWM dimming section 17 in accordance with the instruction signal from the current setting section 14, and the PWM dimming section 17 supplies electric power to the light-emitting diodes 4 by using the duty ratio having been set by the duty setting section 16 and the current from the constant current circuit section 15.

The timer section 13 as shown in FIG. 4 includes an A/D converting section 13*a* that subjects a dimming instruction signal having been inputted therein to an analog/digital conversion process, and a comparator section 13*b* to which data of the dimming instruction signal from the A/D conversion section 13*a* is inputted. The timer section 13 includes further a clock generating section 13*c* that generates a clock pulse, and a divider section 13*d* that divides the clock pulse from the clock generating section 13*c* in accordance with the instruction signal from the comparator section 13*b*. Further, the timer section 13 includes a counter section 13*e* that counts the clock pulse from the divider section 13*d*, and a correction timing instructing section 13*f* that outputs instruction signals to the current value setting section 14 and to the duty setting section 16 by using the count result (namely, the lighting time of the light-emitting diodes 4) from the counter section 13*e* and the correction time setting value stored in the table 18.

As the correction time setting value, for example a setting value as a unit of 1000 hours is used. The correction timing instructing section 13*f* is configured to modify the current value provided from the constant current circuit section 15 to the PWM dimming section 17 and also the duty ratio that is set by the duty setting section 16, every time the lighting time of the light-emitting diodes 4 exceeds the set values.

The comparator section 13*b* compares the data of the dimming instruction signal and the threshold value in the table 18, thereby instructing the division rate of the divider section 13*d*. Namely, the timer section 13 modifies the count result at the counter section 13*e* in accordance with the dimming rate at the light-emitting diodes 4. Specifically, in a case where a dimming rate of 50% is retained in the table 18 as the threshold value, when the data of the dimming instruction signal are less than 50%, the comparator section 13*b* outputs an instruction signal to the divider section 13*d* so as to divide the clock pulse to ½ times. Thereby, at the divider section 13*d*, the clock pulse from the clock generating section 13*c* is divided to ½ times and outputted to the counter section 13*e*.

When the data of the dimming instruction signal are 50% or more, the comparator section 13*b* outputs to the divider section 13*d* an instruction signal of a division rate of 1×, i.e., an instruction signal for instructing not to divide the clock pulse.

As mentioned above, at the timer section 13, the comparator section 13*b* modifies the division rate at the divider section 13*d* in accordance with the level of the dimming instruction signal (dimming rate). Thereby, the counting operation at the counter section 13*e* can be modified between a case where the light-emitting diodes 4 are lighted at a low luminance and a case where the light-emitting diodes 4 are lighted at a high luminance. As a result, the decision operation at the correction timing instructing section 13*f*, i.e., instruction signals to the current value setting section 14 and to the duty setting section 16 can be outputted at a more suitable timing in accordance with the aged deterioration of the light-emitting diodes 4.

The above description does not limit the present embodiment, but the threshold value may include setting a dimming rate of 25%, 50% and 75%. In that case, the comparator section 13*b* instructs division rates of ¼ times, 2/4 times, ¾ times and 4/4 times corresponding respectively to four stages of at least 0% and less than 25%, at least 25% and less than 50%, at least 50% and less than 75%, and at least 75% and not more than 100%.

The current value setting section 14 includes a reference voltage generating section 14*a* that generates a reference voltage and also a current monitor element 14*b*. The current monitor element 14*b* is connected between the reference voltage generating section 14*a* and the constant current circuit section 15, and monitors the current outputted from the constant current circuit section 15 to the PWM dimming section 17. At the current value setting section 14, a reference voltage at the reference voltage generating section 14*a* is selected from the data in the table 18 in accordance with the instruction signal from the correction timing instructing section 13*f*, thereby the level of the constant current generated at the constant current circuit section 15 is modified, and the value of supply current from the PWM dimming section 17 to the light-emitting diodes 4 also is modified.

The duty setting section 16 includes a first pulse generating section 16*a* to which the dimming instruction signal is inputted, a second pulse generating section 16*b* to which the instruction signal from the correction timing instructing section 13*f* is inputted, and a pulse superimposing section 16*c* that superimposes the pulses from the first and second pulse generating sections 16*a*, 16*b*. The first pulse generating section 16*a* outputs a pulse corresponding to the inputted dimming instruction signal, to the pulse superimposing section 16*c*.

The second pulse generating section 16*b* is configured to output a pulse of a predetermined pulse width to the pulse superimposing section 16*c*. Furthermore, when an instruction signal from the correction timing instructing section 13*f* is inputted, this second pulse generating section 16*b* acquires from the table 18 a value of an enlargement rate (for example, 5%) to increase the pulse width of the pulse to be outputted to the pulse superimposing section 16*c*, and outputs to the pulse superimposing section 16*c* a pulse that has a pulse width increased corresponding to the value of the thus acquired enlargement rate. Namely, the second pulse generating section 16*b* is configured to output a pulse corresponding to the lighting time at the light-emitting diodes 4 to the pulse superimposing section 16*c*.

Hereinafter, at the pulse superimposing section 16*c*, the pulses from the first and second pulse generating sections 16*a*, 16*b* are superimposed, and thereby to generate a pulse that reflected the dimming instruction signal and the lighting time at the light-emitting diodes 4. And the pulse superimposing section 16*c* outputs the generated pulse to the PWM dimming section 17 as an instruction signal that instructs the ON time (the duty ratio) in the PWM cycle at the PWM dimming.

At the PWM dimming section 17, during the ON time in the PWM cycle instructed through the instruction signal from the pulse superimposing section 16*c*, a current from the constant current circuit section 15 is flown as a supply current to the light-emitting diodes 4. At the PWM dimming section 17, in accordance with the lighting time (aged deterioration) of the light-emitting diodes 4, at the time of adjusting automatically the color tone of the illumination light to the above-mentioned predetermined color tone, the ON time of the duty ratio and the value of supply current are modified in a state where the value of effective current to be supplied to the light-emitting diodes 4 is kept constant.

As mentioned above, in the backlight device 2 of the present embodiment, in accordance with the above-described correction time setting value in the table 18, the correction timing instructing section 13*f* of the time section 13 outputs instruction signals to the reference voltage generating section 14*a* and to the second pulse generating section 16*b*, and at the same time, the reference voltage generating section 14*a* and the second pulse generating section 16*b* use respectively data in the table 18 (reference voltage and enlargement rate of the pulse width). Namely, in the backlight device 2 of the present embodiment, the timer section 13 and the table 18 compose a drive instructing section that modifies the ON time of the duty ratio and the value of supply current in a state where the value of effective current to be supplied to the light-emitting diodes 4 is kept constant, at a time of adjusting the color tone of illumination light to a predetermined color tone.

Next, the operations of the backlight device 2 of the present embodiment will be specified with reference to FIG. 5. The explanation below mainly refers to an adjustment operation to adjust automatically a color tone of illumination light to the predetermined color tone.

Figure 5A:
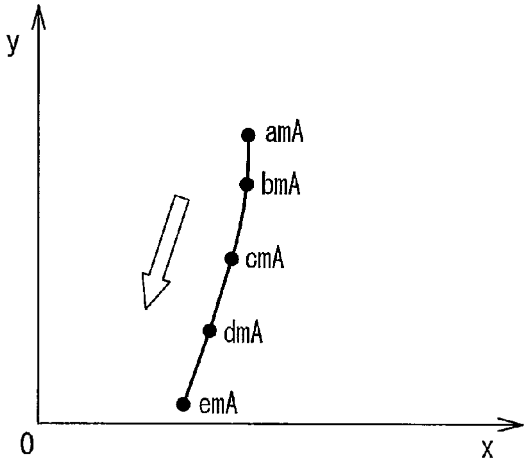
FIG. 5A is a graph showing the light emission property of the light-emitting diode as shown in FIG. 1.
Figure 5B:
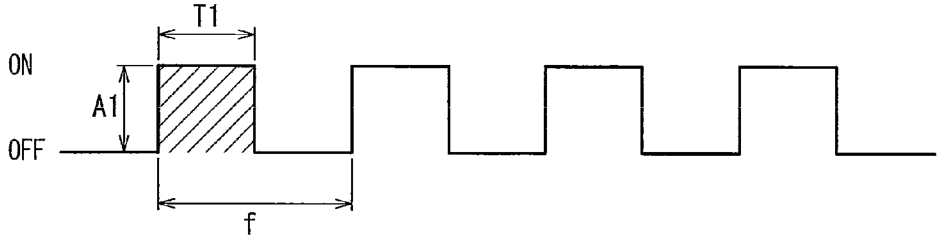
FIGS. 5B and 5C are graphs respectively showing voltage waveforms to light-emitting diodes before and after an adjustment operation with respect to the color tone of illumination light.
Figure 5C:
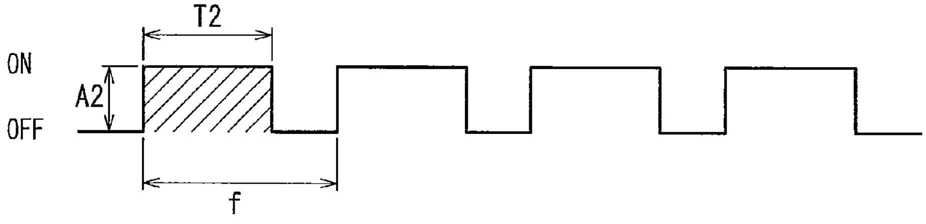

FIG. 5 includes graphs for illustrating an example of operations of the backlight device. FIG. 5A is a graph showing a light emission property of the light-emitting diode as shown in FIG. 1. FIGS. 5B and 5C are graphs respectively showing voltage waveforms with respect to the light-emitting diodes before and after the operation of adjusting the color tone of the illumination light.

In the light-emitting diode 4, in accordance with the aged deterioration, the color tone changes as indicated with an arrow in FIG. 5A. Namely, in the light-emitting diode 4, when the fluorescent material, the sealing resin and the like deteriorate due to aging, the luminescent color shifts to the blue-color side for example as a result of the aged deterioration. On the other hand, at the light-emitting diode 4, as indicated with a curve in FIG. 5A, with the increase of the drive-current value (value of supply current) as a mA, b mA, c mA, d mA and e mA, the color tone also shifts to the blue-color side.

Therefore, in the backlight device 2 of the present embodiment, in a case where a dimming rate of arbitrary N % (N is an integer) is instructed by the dimming instruction signal, the LED lighting circuit 12 determines the ON time at the PWM frequency f as T1 and the value of supply current as A1 at the initial stage (for example, at a stage of factory shipment). Later, in a case where the lighting time of the light-emitting diodes 4 exceeds the set value for the correction time and the correction timing instructing section 13*f* outputs instruction signals to the reference voltage generating section 14*a* and to the second pulse generating section 16*b*, when the above-described N % dimming rate is instructed, the reference voltage at the reference voltage generating section 14*a* is decreased and the pulse width of the pulse from the second pulse generating section 16*b* is increased on the basis of the data in the table 18 in the LED lighting circuit 12. Thereby, at the LED lighting circuit 12, the ON time at the PWM frequency f is determined as T2 and the value of supply current is determined as A2 so that the value of effective current indicated as the respective slashed parts in FIGS. 5B and 5C will be constant, and thus the light-emitting diodes 4 are supplied with electric power so that the color tone of the illumination light is adjusted to the predetermined color tone. Namely, the value of supply current is made smaller than A1 so as to shift the color tone of the illumination light to the yellow-color side, and at the same time, the ON time is made larger than T1 so as to prevent the value of effective current from changing, thereby preventing fluctuation in the luminance so as to carry out an adjustment operation.

In the thus configured backlight device 2 of the present embodiment, the LED lighting circuit (lighting control section) 12 is capable of controlling the lighting drive of the white light-emitting diodes 4 by using the PWM dimming. At the same time, the LED lighting circuit 12 adjusts the color tone of the illumination light toward the liquid crystal panel (exterior) 3 by modifying the ON time of the duty ratio by PWM dimming and also the value of supply current to be supplied to the light-emitting diodes 4. Thereby, unlike a conventional backlight device, in the present embodiment, even when the white light-emitting diodes 4 deteriorate due to aging, the color tone of the illumination light toward the exterior can be adjusted, and thus a backlight device 2 having excellent light emission performance can be provided.

Further in the backlight device 2 of the present embodiment, as shown in FIGS. 5B and 5C, when the LED lighting circuit 12 adjusts the color tone of the illumination light to the predetermined color tone, the ON time of the duty ratio and the value of supply current are modified in a state where the value of effective current to be supplied to the light-emitting diodes 4 is kept constant. Thereby, in the backlight device 2 of the present embodiment, fluctuation in the luminance of the illumination light can be prevented, and the backlight device 2 having higher performance can be provided.

Further, as mentioned above, the backlight device 2 of the present embodiment is capable of adjusting the color tone of the illumination light without causing fluctuation in the luminance. Therefore, a backlight device having remarkably reduced number of light-emitting diodes in comparison with a backlight device using RGB tricolor light-emitting diodes can be configured easily and the backlight device is used favorably to a monochrome liquid crystal display device.

The monochrome liquid crystal display device is used for medical purposes such as MRI or X ray radiograph analysis or design purposes such as CG (computer graphics). Therefore, the monochrome liquid crystal display device is required to finely adjust the color tone of the illumination light. Regarding this, the backlight device 2 of the present embodiment that modifies the ON time and the value of supply current can adjust the color tone of illumination light without causing fluctuation in the luminance, and thus the backlight device 2 can meet adequately the requirements for the monochrome liquid crystal display device as described above.

Further in the backlight device 2 of the present embodiment, the timer section 13 is configured to modify the ON time of the duty ratio and the value of supply current in accordance with the lighting time of the light-emitting diodes 4. Thereby, in the backlight device 2 of the present embodiment, the ON time and the value of supply current can be modified suitably in accordance with the aged deterioration of the light-emitting diodes 4. And thus, the color tone of the illumination light can be adjusted suitably to maintain easily the excellent light emission performance.

Further, in the backlight device 2 of the present embodiment, since the LED lighting circuit 12 employs as the predetermined color tone the initial value of the color tone of light emitted by the light-emitting diodes 4, the change in the color tone caused by the aged deterioration of the light-emitting diodes 4 can be suppressed surely.

Further since the liquid crystal display device 1 of the present embodiment uses the backlight device 2 with excellent light emission performance that can adjust the color tone of illumination light toward the exterior even when the white light-emitting diodes 4 deteriorate due to aging, a low-cost and high-performance liquid crystal display device 1 having an excellent display quality can be configured easily.

Embodiment 2

Figure 6:
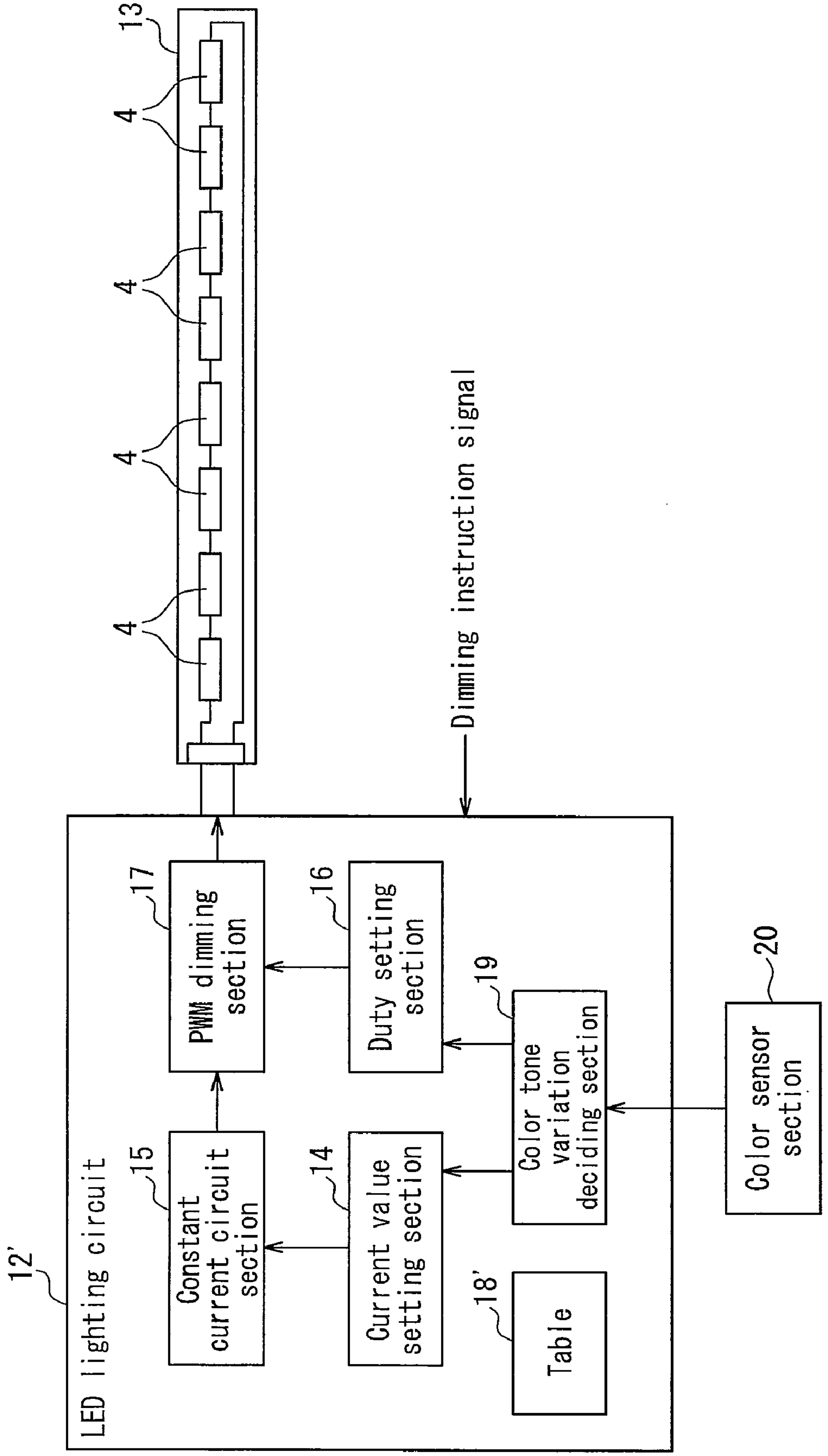
FIG. 6 is a diagram for illustrating an example of configuration of a LED lighting circuit in a backlight device according to Embodiment 2 of the present invention.
Figure 7:
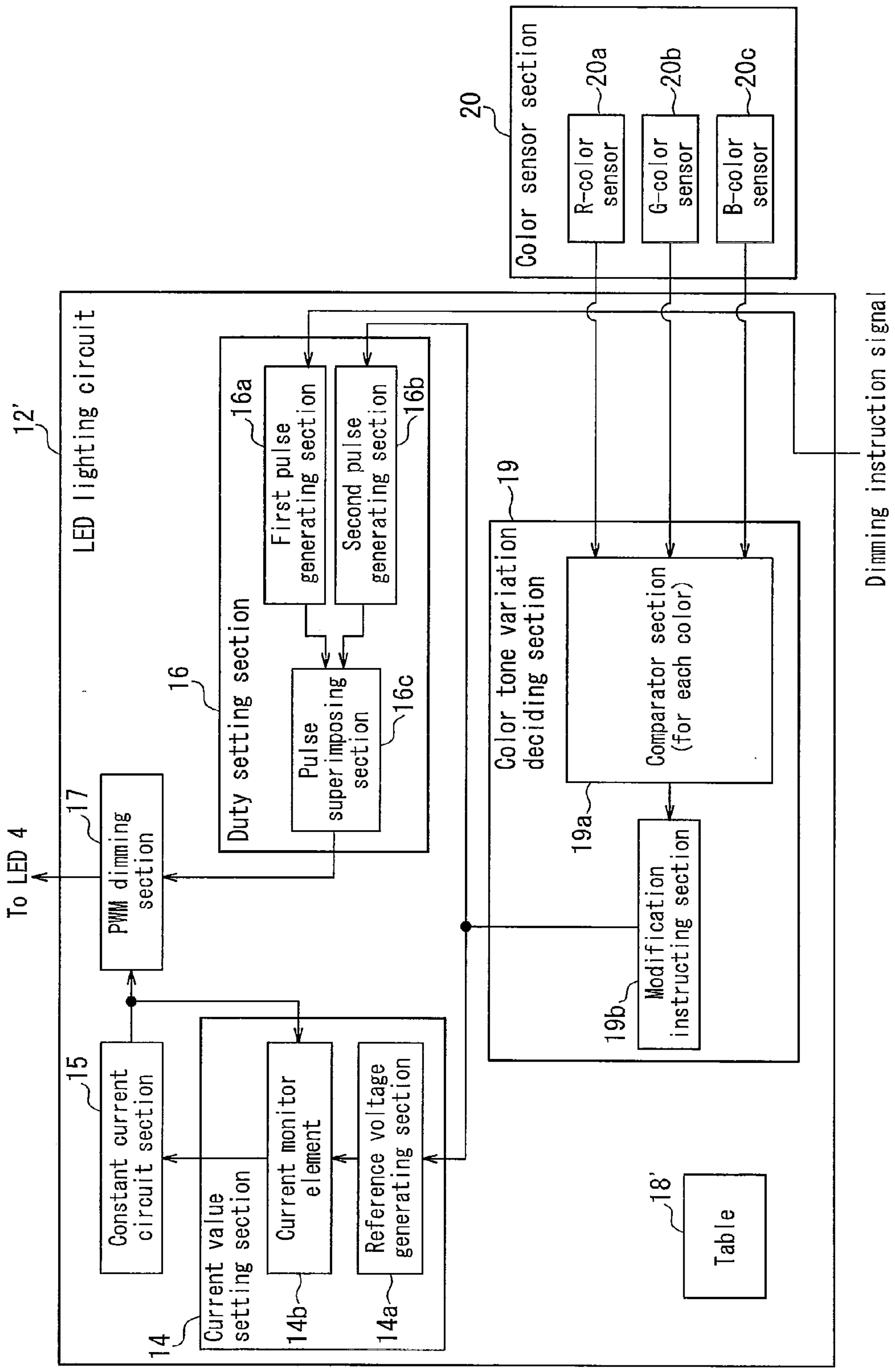
FIG. 7 is a block diagram for showing a specific configuration of the LED lighting circuit as shown in FIG. 6.

FIG. 6 is a diagram illustrating an example of configuration of a LED lighting circuit in a backlight device according to Embodiment 2 of the present invention, and FIG. 7 is a block diagram showing a specific configuration of the LED lighting circuit as shown in FIG. 6. The figures show that the present embodiment is distinguished from Embodiment 1 mainly in that a color sensor section for detecting the chromaticity of the illumination light is provided, and that the timer section in the LED lighting circuit is replaced by a color tone variation deciding section. The color tone variation deciding section includes a deciding section that decides the variation of the color tone of the illumination light by using the detection result from the color sensor section, and a modification instructing section that modifies the ON time of the duty ratio and the value of supply current by using the decision result from the deciding section. In the following description of embodiment, the same reference numerals may be assigned to the same components as those of Embodiment 1 in order to avoid the duplication of explanations.

Namely, as shown in FIG. 6 and FIG. 7, the backlight device 2 of the present embodiment includes a table 18' in which predetermined data are stored in advance, and a color tone variation deciding section 19 that is connected to a color sensor section 20 detecting the chromaticity of the illumination light and that decides the variation of the color tone of the illumination light by using the detection result from the color sensor section 20. Further in the backlight device 2 of the present embodiment, similarly to Embodiment 1, the color tone variation deciding section 19 and the table 18' compose the drive instructing section that modifies the ON time of the duty ratio and the value of supply current in a state where the value of effective current to be supplied to the light-emitting diodes 4 is kept constant, at the time of adjusting the color tone of the illumination light to the predetermined color tone.

The color sensor section 20 is arranged in the vicinity of the light guide plate 5 for example, and it includes R-color sensor 20*a*, a G-color sensor 20*b* and a B-color sensor 20*c* that detect respectively the chromaticity of red (R), green (G) and blue (B) contained in the illumination light.

Detection results for independent RGB of the color sensor section 20 at the initial stage of the lighting operation of the light-emitting diodes 4 (for example, at the stage of factory shipments) and instruction signals (reference voltage and enlargement rate of pulse width) to the reference voltage generating section 14*a* and the second pulse generating section 16*b*, which correspond to a variation based on the detection results as the reference values, are attained previously through experiments, simulations or the like, and stored in the table 18'.

The color tone variation deciding section 19 includes a comparator section 19*a* and a modification instructing section 19*b*. The comparator section 19*a* is a deciding section connected to the R-color sensor 20*a*, the G-color sensor 20*b* and the B-color sensor 20*c*, and to which the respective detection results are inputted. The modification instructing section 19*b* is connected between the comparator section 19*a* and, the reference voltage generating section 14*a* and the second pulse generating section 16*b*. The comparator section 19*a* decides the variation of the color tone of the illumination light for each color of RGB by using the detection results for each color of RGB and the data in the table 18'. The modification instructing section 19*b* establishes the reference voltage and the enlargement rate of the pulse width by using the decision result from the comparator section 19*a* and the data in the table 18', and outputs the reference voltage and the enlargement rate of the pulse width in a state contained respectively in the instruction signals to the reference voltage generating section 14*a* and to the second pulse generating section 16*b*. Thereby, the ON time of the duty ratio and the value of supply current are modified in accordance with the instruction signal from the modification instructing section 19*b*.

According to the above-mentioned configuration, the backlight device 2 of the present embodiment provides effects comparable to those of Embodiment 1. Further the backlight device 2 of the present embodiment is provided with the color sensor section 20 to detect chromaticity of illumination light for each of the colors RGB. And the comparator section (deciding section) 19*a* decides the variation of the color tone of the illumination light by using the detection results from the color sensor section 20 for each color of RGB, and the modification instructing section 19*b* modifies the ON time of the duty ratio and the value of supply current by using the detection result from the comparator section 19*a*. Thereby, according to the present embodiment, the backlight device 2 that can adjust the color tone of illumination light precisely and that has an excellent light emission performance can be configured easily.

The above embodiments are shown merely for an illustrative purpose and are not limiting. The technical range of the present invention is defined by the claims, and all the changes within a range equivalent to the configuration recited in the claims also are included in the technical range of the present invention.

For example, although the above explanation refers to a case of applying the present invention to a transmission type liquid crystal display device, the backlight device of the present invention is not limited to this example. The present invention can be applied to various kinds of display devices that have non-luminous type display sections displaying information such as images and characters by utilizing light from light-emitting diodes. Specifically, the backlight device of the present invention can be applied suitably to a semi-transparent liquid crystal display device, or a projection type display device using a liquid crystal panel as its light bulb.

In addition to the examples described above, the present invention can be applied preferably to an X-illuminator used to irradiate x-ray radiographs with light, a light box that irradiates negative images or the like with light to make them more visually identifiable or a backlight device of a light-emitting device for illuminating billboards or ads placed on walls in station premises.

The above explanation refers to a case of applying the present invention to an edge-light type backlight device having a LED mount board that has a plurality of light-emitting diodes mounted linearly and a light guide board. However, the present invention is not limited to the above example in the number of the light-emitting diodes and the method (location) of arranging the light-emitting diodes or existence of the light guide plate or the like, as long as the backlight device including a lighting control section configured to be capable of controlling the lighting drive of (pseudo) white light-emitting diode by use of PWM dimming, the lighting control section adjusts the color tone of the illumination light by modifying the ON time of the duty ratio by PWM dimming and the value of supply current to be supplied to the light-emitting diode. Namely, the present invention can be applied to other type of backlight devices such as direct type or tandem type devices.

Although the above explanation refers to a configuration of using a reference voltage generating section as the current value setting section, the current value setting section is not limited to this example. Alternatively, it can be a configuration where a value of (supply) current outputted from the constant current circuit section is modified by using a variable resistor for example.

Although the above explanation refers to a case of using light-emitting diodes that have been classified into any of at least two chromaticity ranks on the basis of a result of preliminary measurement of chromaticity, the present invention is not limited to this example. In addition to the above-mentioned light-emitting diodes, light-emitting diodes, which include a light-emitting component that emits light of a first color other than blue (UV light, for example) and a wavelength absorber or a fluorescent material that converts the light of first color to a light of second color in a complementary relationship with the light of first color is provided, and mix the lights of first and second colors so as to emit white light can be used.

It should be noted however, that a use of light-emitting diodes classified into any one of chromaticity ranks is preferred, since a backlight device having an excellent light emission performance can be configured. Such a backlight device can adjust the color tone of the illumination light more easily even by using a plurality of (pseudo) white light-emitting diodes whose light emission performance varies comparatively depending on products.

In addition to the above explanations, it is also possible to combine Embodiment 1 and Embodiment 2.

INDUSTRIAL APPLICABILITY

The present invention can be applied favorably to a backlight device with excellent light emission performance that can adjust a color tone of illumination light toward the exterior even when a white light-emitting diode deteriorates due to aging, and the present invention can be applied favorably to a display device using the backlight device.

The invention claimed is:

1. A backlight device that emits illumination light toward the exterior, comprising:

a white light-emitting diode that emits white light; and a lighting control section that is capable of controlling lighting drive of the light-emitting diode by using PWM dimming, the lighting control section modifies ON time of a duty ratio by the PWM dimming and a value of supply current to be supplied to the light-emitting diode, and thereby to adjust a color tone of the illumination light, wherein the lighting control section comprises a drive instructing section that has a timer section that modifies the ON time of the duty ratio and the value of supply current in accordance with the lighting time of the light-emitting diode, where a value of effective current to be supplied to the light-emitting diode is kept constant, at the time of adjusting the color tone of the illumination light to a predetermined color tone.

2. The backlight device according to claim 1, wherein the predetermined color tone is an initial value of a color tone of light emitted by the light-emitting diode.

3. The backlight device according to claim 1, wherein the light-emitting diode in use is classified into any of at least two chromaticity ranks based on a result of a preliminary measurement of chromaticity.

4. A display device using the backlight device according to claim 1.

5. A backlight device that emits illumination light toward the exterior, comprising:

a white light-emitting diode that emits white light;

a color sensor section that detects chromaticity of the illumination light; and a light control section modifies ON time of a duty ratio by the PWM dimming and a value of supply current to be supplied to the light-emitting diode, and thereby to adjust a color tone of the illumination light, wherein the light control section comprises a drive instruction section comprising a deciding section that decides variation of the color tone of the illumination light by using a detection result from the color sensor section, and a modification instructing section that modifies the ON time of the duty ratio and the value of supply current by using the decision result from the deciding section, where a value of effective current to be supplied to the light-emitting diode is kept constant, at the time of adjusting the color tone of the illumination light to a predetermined color tone.

6. The backlight device according to claim 5, wherein the predetermined color tone is an initial value of a color tone of light emitted by the light-emitting diode.

7. The backlight device according to claim 5, wherein the light-emitting diode in use is classified into any of at least two chromaticity ranks based on a result of preliminary measurements of chromaticity.

8. A display device using the backlight device according to claim 5.

* * * * *